Aug. 31, 1965 R. A. BODA 3,203,390
STEERING DIRECTION INDICATOR MEANS FOR MARINE PROPULSION UNITS
Filed Jan. 7, 1964 2 Sheets-Sheet 1
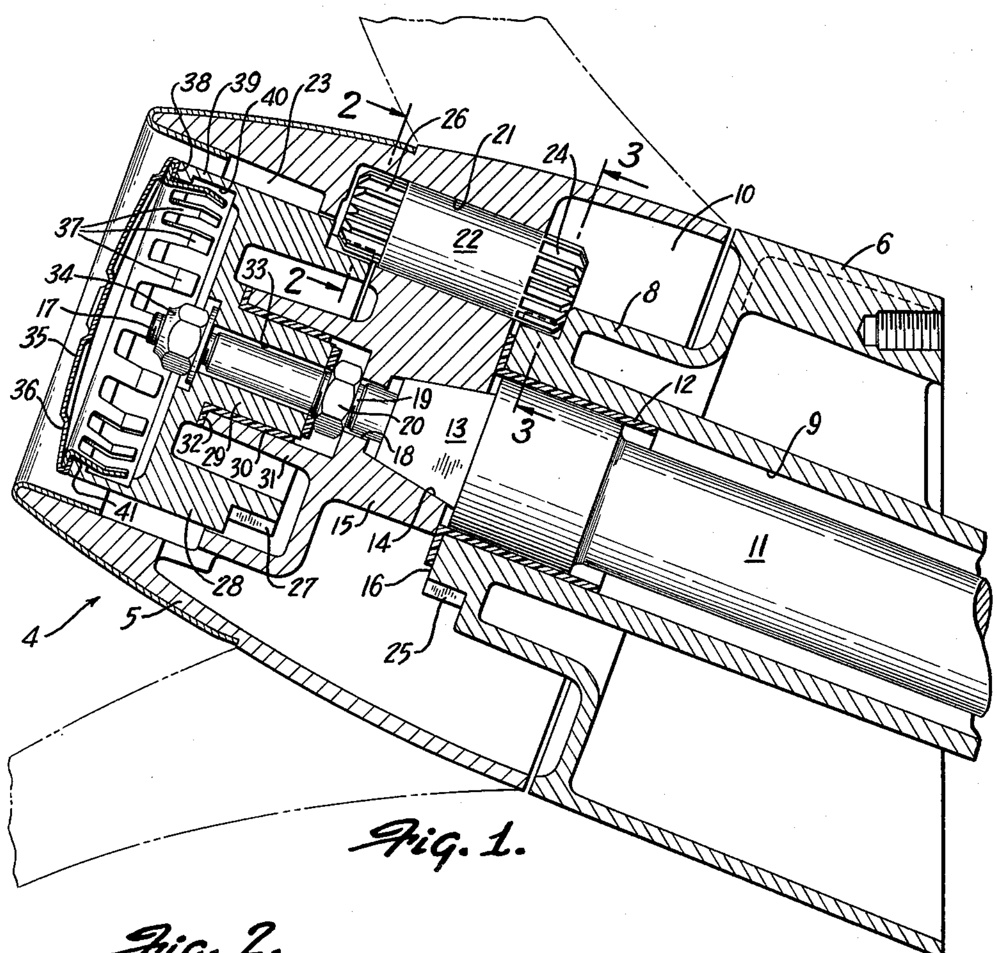
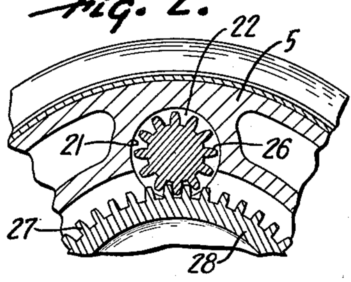
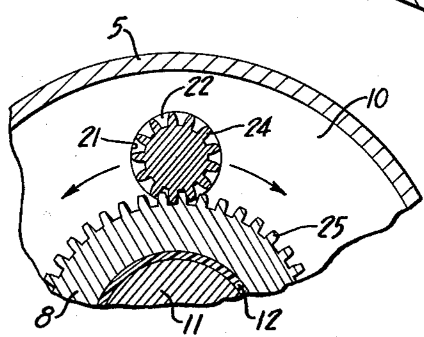
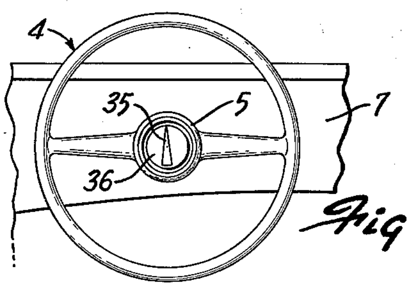
INVENTOR
ROBERT A. BODA
BY Andrus & Starke
ATTORNEYS

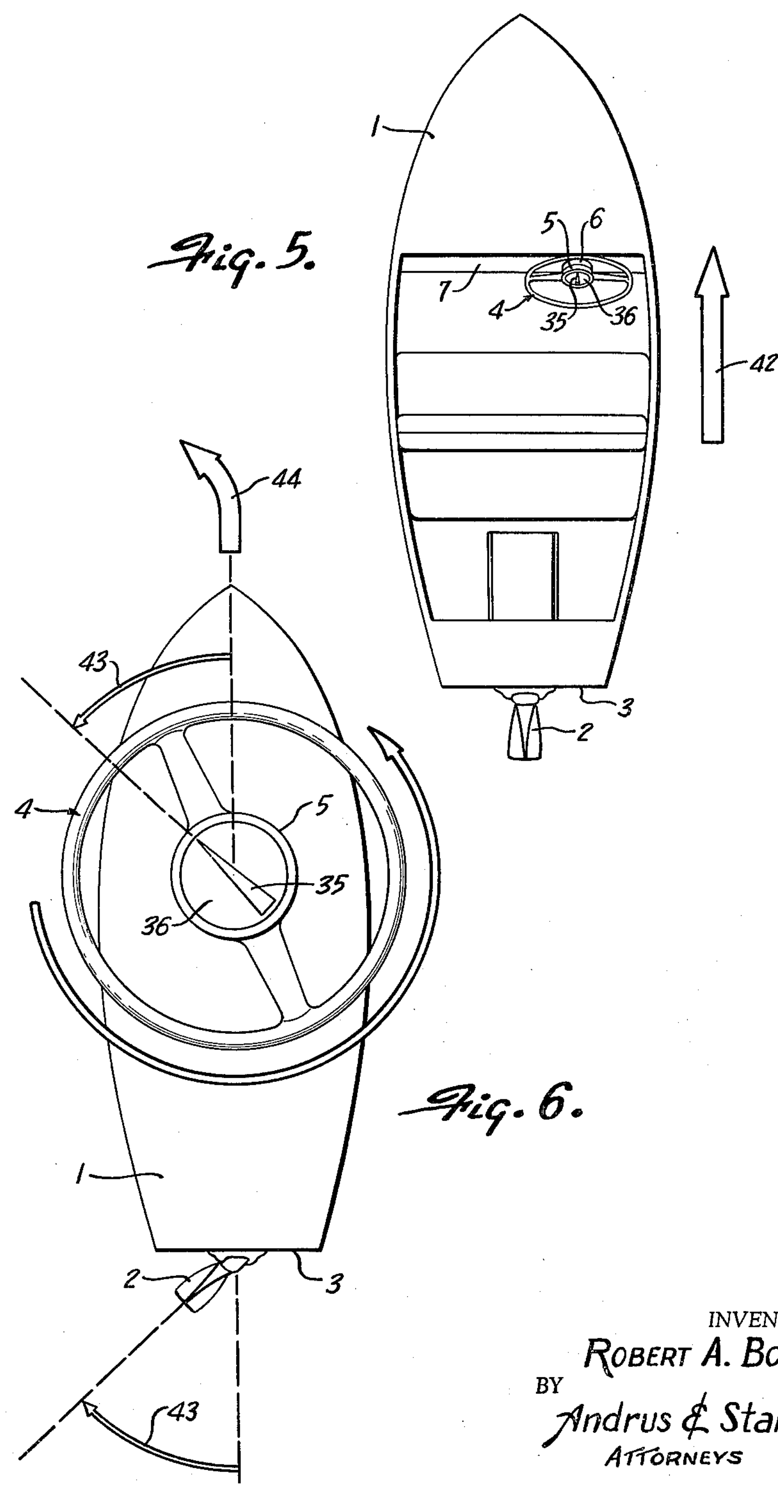
INVENTOR.
ROBERT A. BODA
BY
Andrus & Starke
ATTORNEYS

United States Patent Office 3,203,390

Patented Aug. 31, 1965

3,203,390

STEERING DIRECTION INDICATOR MEANS FOR MARINE PROPULSION UNITS

Robert A. Boda, Oshkosh, Wis., assignor to Kiekhaefer Corporation, Fond du Lac, Wis., a corporation of Wisconsin Filed Jan. 7, 1964, Ser. No. 336,300
3 Claims. (Cl. 116—31)

This invention relates to a steering direction indicator means as may be employed for marine propulsion units.

Outboard motors hidden by motor wells, stern drive units and water jet drive units mounted low on a boat transom, as well as the rudders of inboard boats are generally not visible to the operator from the steering position within the boat. With marine installations of these types it has been generally necessary for the operator to check the angle of the propulsion unit or rudder or to check with passengers regarding its position, resulting in some delay and inconvenience before getting under way. As an alternative the operator might resort to the sometimes dangerous practice of placing his propulsion unit in gear and correcting his direction of travel after getting under way. It is generally an object of this invention to provide, in connection with the steering mechanism for a boat, an indicator means which at all times shows the position of the propulsion unit or rudder means and at a glance tells the operator in which direction his boat will move when getting under way.

According to this invention, a steering direction indicator is provided in the hub of a marine steering wheel. The indicator means turns simultaneously and in the same direction with movements of the steering wheel but rotates at a slower rate than the wheel to reflect generally the corresponding steering movement of the propulsion unit or rudder means. The desired movement of the indicator means is attained by means of a planet gear arrangement within the steering wheel hub.

The drawings furnished herewith illustrate the best mode of carrying out the invention as presently contemplated and set forth hereinafter.

In the drawings:

FIGURE 1 is a sectional view of a steering wheel hub showing the steering direction indicating means of this invention;

FIG. 2 is a view taken generally on line 2—2 of FIG. 1;

FIG. 3 is a view taken generally on line 3—3 of FIG. 1;

FIG. 4 is generally a plan view of a marine steering wheel equipped with the hub indicator means of this invention;

FIG. 5 is a plan view of a boat driven by a dirigible outboard propulsion unit and showing the steering wheel hub indicator means indicating the position of the unit for generally straight line travel; and FIG. 6 is a diagrammatic view which shows that in a turn maneuver the steering wheel hub indicator means is angularly displaced an amount generally in conformity with the angular adjustment of the propulsion unit and indicates generally the direction of travel of the boat.

Referring to the drawings, the boat 1 is driven by an outboard propulsion unit such as the stern drive unit 2 which is mounted low on the boat transom 3 and is rotatable on a generally vertical axis to provide steering control means for the boat. Steering movements of the drive unit 2 are controlled by a steering wheel 4 operatively connected to the drive unit and generally disposed at a location within the boat from which the unit is not visible to the operator.

According to this invention, steering direction indicator means are provided in the hub 5 of the steering wheel

4 which at all times shows the operator the position of the drive unit 2 and at a glance indicates the direction the boat will move when getting under way.

The steering wheel assembly includes the housing or mounting bracket 6 having one end thereof adapted for connection to a transverse boat member 7 to support the wheel assembly. The mounting bracket 6 is generally cylindrical and has an outside diameter which corresponds generally to that of the adjacent portion of hub 5 so that the outer surface of the hub generally appears as a continuation of the bracket surface. The hub end of mounting bracket 6 includes the cylindrical stepped projection 8 which is generally coaxial with respect to the axial bore 9 in the bracket and extends into the adjacent inner hub recess 10.

The steering shaft 11 is rotatably supported within a suitable sleeve bearing 12 disposed in the bore 9 of mounting bracket 6. The hub end of shaft 11 is provided with a generally rectangular tapered block 13 which is received within a correspondingly shaped recess 14 in the hub support frame 15 to rotationally lock the steering wheel 4 relative to the shaft. In the assembly the hub support frame 15 bears against the radial portion of bearing 12 which is seated on the end 16 of bracket projection 8.

A stepped pin member 17 projects axially from the tapered block 13 on shaft 11 and extends through the opening 18 in the hub support frame 15. The pin member 17 is provided with an intermediate threaded portion 19 which is adapted to threadedly receive the nut 20 to secure the steering wheel hub 5 onto the shaft 11.

The hub support frame 15 is provided with an axially extending through bore 21 which is spaced radially from the axis of shaft 11. The planet member 22 is rotatably disposed in bore 21 and the respective ends thereof project beyond the support frame 15 into the inner hub recess 10 and outer hub recess 23. The gear 24 is formed on the end portion of planet member 22 in hub recess 10 and is meshingly engaged with the fixed gear 25 provided on projection 8 of the mounting bracket 6. With rotation of steering wheel 4, the hub 5 thereof carries the planet member 22 in a circular path about fixed gear 25 which through engagement with gear 24 causes the planet member 22 to rotate about its axis.

The opposite portion of planet member 22 which extends into the hub recess 23 has a gear 26 formed thereon which drivingly meshes with the gear 27 on the indicator carrier 28 disposed in recess 23. The carrier 28 is adapted to rotate relative to the steering shaft 11 and wheel 4 and includes the shaft portion 29 generally concentric with respect to gear 26 and rotatably supported within a suitable sleeve bearing 30 disposed within the tubular post 31 projecting from the hub support frame 15. An annular shoulder 32 on the carrier 28 bears on the radial portion of bearing 30 seated on the outer end of tubular post 31. An axial bore 33 in shaft portion 29 extends through the carrier 28 and is adapted to receive with clearance the pin member 17 on shaft 11. The carrier 28 is axially confined on the pin member 17 by the nut 34 threaded onto the end thereof.

As indicating indicia generally in the form of an arrow 35 is provided on the circular plate 36 having a plurality of circumferentially spaced spring tabs 37 depending therefrom. Outwardly of the ring of tabs 37 the plate 36 includes a radial shoulder 38 which seats against the end of wall 39 forming a cylindrical cavity 40 on the end of carrier 28. In the assembly of the plate 36 to the carrier 28, the tabs 37 project into cavity 40 and are sprung inwardly by the circumferential lip 41 extending radially from wall 39 to secure the plate to the carrier.

The plate 36 in the first instance is oriented with respect to carrier 28 to place the arrow 35 in the zero position as generally shown in FIGS. 4 and 5 when the stern drive unit 2 is in position to drive the boat 1 on a straight line course as indicated by the direction arrow 42. The train of gearing within the steering wheel hub 5 comprising the gears 25, 24, 26 and 27 provides means whereby the rotary motion of the steering shaft 11 and wheel 4 will be imparted to the indicator carrier 28 and thereby turn the carrier relative to the wheel hub. The gear ratio is such that the arrow 35 will be turned from the zero position generally in conformity with the angular adjustment of the stern drive unit 2 as is shown in FIG. 6 wherein the angles 43 are generally of equal size. As is further most clearly shown in FIG. 6, the gearing arrangement provides for rotation of the arrow 35 in a direction oppositely from rotation of the stern drive unit 2 on its axis so that the direction of the arrow will point or indicate the general direction in which the boat 1 will move as indicated by the direction arrow 44.

The steering direction indicator means of this invention will be especially helpful to the operator when getting his boat under way. At one glance he is able to anticipate his boat's movements without delay and inconvenience to himself and others.

Various modes of carrying out the invention are contemplated as being within the scope of the following claims particularly pointing out and distinctly claiming the subject matter which is regarded as the invention.

I claim:

1. In the steering mechanism for marine propulsion steering means, the combination including a steering shaft rotatable on a steering axis and operatively connected to said steering means, a housing for said steering shaft, a steering wheel having a hub secured on said shaft, a first gear provided on said housing coaxially with respect to the steering axis, an indicator carrier coaxially supported with respect to the steering axis and on the opposite side of the hub from said housing and being rotatable relative to the hub, a second gear provided on said carrier, a planet member rotatably carried by the hub, opposed gears provided on said member corresponding to said first and second gears and meshingly engaged therewith, said planet member being rotatable on its own axis to drive the indicator carrier while being carried by the hub about said first gear, said gears being arranged to provide for rotation of the indicator carrier in a direction oppositely from rotation of the propulsion steering means to indicate the direction of travel and having a gear ratio adapted to rotate the indicator carrier in substantial conformity with the angular adjustment of the propulsion steering means.

2. In the steering mechanism for marine propulsion steering means, the combination including a steering wheel having a hub operatively connected to the marine propulsion steering means, a support frame in said hub generally normal to the hub axis, a gear disposed on each side of the support frame and coaxially with the hub, one of said gears being fixed and the other being rotatable relative to the hub, indicator means carried by the rotatable gear, and an axially extending gear member rotatable disposed in a bore provided in the hub support frame in offset relation from the hub axis and operatively connecting the fixed gear and the rotatable gear, said gear member being rotatable on its own axis to drive the indicator means while being carried by the hub about the fixed gear, said gears and gear member being arranged to provide for rotation of the indicator means in a direction oppositely from rotation of the propulsion steering means to indicate the direction of travel and having a gear ratio adapted to rotate the indicator means in substantial conformity with the angular adjustment of the propulsion steering means.

3. In the steering mechanism for marine propulsion steering means rotatable on a generally vertical axis for steering control of a watercraft, the combination including a steering shaft rotatable on a steering axis and operatively connected to said steering means, a housing for said steering shaft, a steering wheel having a generally hollow hub, a support frame in said hub securable on said shaft to secure the wheel thereto and defining a hub recess, a fixed gear provided on the shaft housing coaxially with respect to the steering axis, steering indicator means supported coaxially with respect to the steering axis within the hub recess, a gear on said indicator means, a planet member rotatably carried by the hub support frame in offset relation from the steering axis, opposed gears provided on said planet member and operatively connecting the fixed gear and the gear on said indicator means, said planet member being rotatable on its own axis to drive the indicator means while being carried by the hub about the fixed gear, said gears being arranged to provide rotation of the indicator means in a direction oppositely from rotation of the propulsion steering means to indicate the direction of travel of the watercraft and having a gear ratio adapted to rotate the indicator means in substantial conformity with the angular adjustment of the propulsion steering means.

References Cited by the Examiner

UNITED STATES PATENTS

| | | | |
|---|---|---|---|
| 2,169,861 | 8/39 | Walsh | 116—31 |
| 2,699,034 | 1/55 | Maire | 58—46 |
| 3,050,025 | 8/62 | Atkeson | 114—144 |

LOUIS J. CAPOZI, *Primary Examiner.*